US006804758B2

(12) United States Patent
Liao et al.

(10) Patent No.: US 6,804,758 B2
(45) Date of Patent: Oct. 12, 2004

(54) METHOD FOR ADAPTIVE ARBITRATION OF REQUESTS FOR MEMORY ACCESS IN A MULTI-STAGE PIPELINE ENGINE

(75) Inventors: Ming-Hao Liao, Hsin-Chu (TW); Hung-Ta Pai, Taichung-Hsien (TW)

(73) Assignee: XGI Technology Inc., Hsinchu (TW)

( * ) Notice: Subject to any disclaimer, the term of this patent is extended or adjusted under 35 U.S.C. 154(b) by 442 days.

(21) Appl. No.: 09/895,604

(22) Filed: Jun. 29, 2001

(65) Prior Publication Data

US 2003/0005253 A1 Jan. 2, 2003

(51) Int. Cl.[7] .......................... G06F 12/00; G06F 13/18

(52) U.S. Cl. ......................... 711/169; 711/158; 710/39; 710/40

(58) Field of Search ................................ 711/140, 151, 711/158, 169; 710/39, 40, 42, 243, 244

(56) References Cited

U.S. PATENT DOCUMENTS 4,855,904 A * 8/1989 Daberkow et al. .......... 712/218
5,222,223 A * 6/1993 Webb et al. ................ 711/140
6,321,233 B1 * 11/2001 Larson ....................... 707/201
6,564,304 B1 * 5/2003 Van Hook et al. .......... 711/154

* cited by examiner

*Primary Examiner*—Gary Portka
(74) *Attorney, Agent, or Firm*—David & Raymond Patent Group; Raymond Y. Chan

(57) ABSTRACT

In a method for adaptive arbitration of requests for accessing a memory unit in a multi-stage pipeline engine that includes a plurality of request queues corresponding to the stages of the pipeline engine, each of the request queues is assigned to one of a high-priority group and a low-priority group in accordance with an operating state of the memory unit. The request queues in the high-priority group are then processed prior to the request queues in the low-priority group.

11 Claims, 4 Drawing Sheets

20
DETECTING WHETHER THE MEMORY UNIT IS IN A MEMORY BOUND STATE
NO
24
DETECTING WHETHER A SERVICE WAITING TIME FOR EACH OF THE REQUEST QUEUES IS GREATER THAN A PREDETERMINED WAITING THRESHOLD
YES
YES
21
DETECTING WHETHER A NUMBER OF REQUESTS IN EACH OF THE REQUEST QUEUES IS GREATER THAN A PREDETERMINED THRESHOLD
YES
NO
25
DETECTING WHETHER A VOLUME OF DATA ASSOCIATED WITH EACH OF THE OTHER REQUEST QUEUES IS GREATER THAN A PREDETERMINED VOLUME THRESHOLD
YES
NO
22
ASSIGNING THE REQUEST QUEUES TO A HIGH-PRIORITY GROUP
23
ASSIGNING THE REQUEST QUEUES TO A LOW-PRIORITY GROUP
NO

METHOD FOR ADAPTIVE ARBITRATION OF REQUESTS FOR MEMORY ACCESS IN A MULTI-STAGE PIPELINE ENGINE

BACKGROUND OF THE INVENTION

1. Field of the Invention

The invention relates to a method for adaptive arbitration of requests for memory access in a multi-stage pipeline engine, more particularly to a method for adaptive arbitration of requests for accessing a memory unit in a multi-stage pipeline engine that can reduce the occurrence of idling or stalling in the multi-stage pipeline engine.

2. Description of the Related Art

A pipeline architecture is commonly found in integrated circuit designs. When processing 3D graphic digital data, generation of 3D graphics includes the steps of geometry and image rendering. Since movement and operation of a large amount of pixel data are needed during processing, a 3D pipeline engine is utilized for increasing throughput of 3D commands.

Referring to FIG. 1, a conventional n-stage pipeline engine 10 includes an arbiter 110, a memory unit 12 for storing different types of data, such as red, green and blue pixel values, alphavalue, Z value, texture data, etc., and a plurality of request queues 131, 131', 131" and data buffers 130, 130', 130" for increasing efficiency of the n-stage pipeline engine 10. The different types of data are accessed in different stages of the n-stage pipeline engine 10. For each request of data access, one of the request queues and a corresponding one of the data buffers are used. The request queue and the corresponding data buffer can be located in different stages, such as the request queue A 131 and the data buffer A 130, and the request queue B 131' and the data buffer B 130', or in the same stage, such as the request queue C 131" and the data buffer C 130", of the n-stage pipeline engine 10.

In the example of FIG. 1, the second and $(n-3)^{th}$ stages in the n-stage pipeline engine 10 have the request queue A 131 and the request queue B 131', respectively, for storing a request therein. When the arbiter 110 serves the request, data associated with the request are read from the memory unit 12. The fourth and $(n-2)^{th}$ stages in the n-stage pipeline engine 10 have the data buffer A 130 and the data buffer B 130', respectively, for storing the data that is associated with the request. The $n^{th}$ stage in the n-stage pipeline engine 10 has the request queue C 131" and the data buffer C 130". When the memory unit 12 is busy or in a memory bound state, the data buffer C 130" stores data to be written to the memory unit 12 so as to minimize stalling while waiting for data access. Furthermore, when the operational speed of the second stage in the n-stage pipeline engine 10 is faster than that of the third stage in the n-stage pipeline engine 10, the output data from the second stage cannot be received instantly by the third stage, thereby resulting in stalling at the second stage. Therefore, a data buffer, such as a pixel FIFO 15, which is located between the second and third stages, is used to store pixel data from the second stage to minimize stalling at the second stage.

The arbiter 110 assigns a fixed priority to the request queues 131, 131', 131" in a known manner. The order of the request queues 131, 131', 131" is determined according to locations of the corresponding data buffers in the n-stage pipeline engine 10. The arbiter 110 assigns the high-priority request queue to that whose associated data buffer is located farthest from an upstream end of the n-stage pipeline engine 10. The following are some of the drawbacks of the fixed priority scheme of the arbiter 110:

1. Since the arbiter 110 does not consider the nature of memory requests and the state of the memory unit 12, reduced utilization of the memory unit 12 can result.

2. Since the arbiter 110 assigns a fixed priority to minimize stalling of the n-stage pipeline engine, bubbling (many stages in the n-stage pipeline engine 10 are idle) may occur when a data buffer located in an upstream side of the n-stage pipeline engine 10 is empty and another data buffer located in a downstream side of the n-stage-pipeline engine 10 is not empty. Referring to FIG. 1, when the data buffer B 130' located in the $(n-2)^{th}$ stage is empty and the data buffer C 130" located in the $n^{th}$ stage is not empty, the arbiter 110 processes data stored in the data buffer C 130" until the data buffer C 130" is empty, thereby resulting in idling of the $(n-2)^{th}$ stage. When the data buffer C 130" is empty, due to the idling of the $(n-2)^{th}$ stage that results in the data buffer B 130' still being empty, the $(n-1)^{th}$, $n^{th}$ stages will be idle.

SUMMARY OF THE INVENTION

Therefore, an object of the present invention is to provide a method for adaptive arbitration of requests for memory access in a multi-stage pipeline engine that can reduce the occurrence of idling or stalling in the pipeline engine.

According to the present invention, a method is adapted for adaptive arbitration of requests for accessing a memory unit in a multi-stage pipeline engine that includes a plurality of request queues corresponding to the stages of the pipeline engine. The method comprises the steps of:

(a) assigning each of the request queues to one of a high-priority group and a low-priority group in accordance with an operating state of the memory unit; and (b) processing the request queues in the high-priority group prior to the request queues in the low-priority group.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
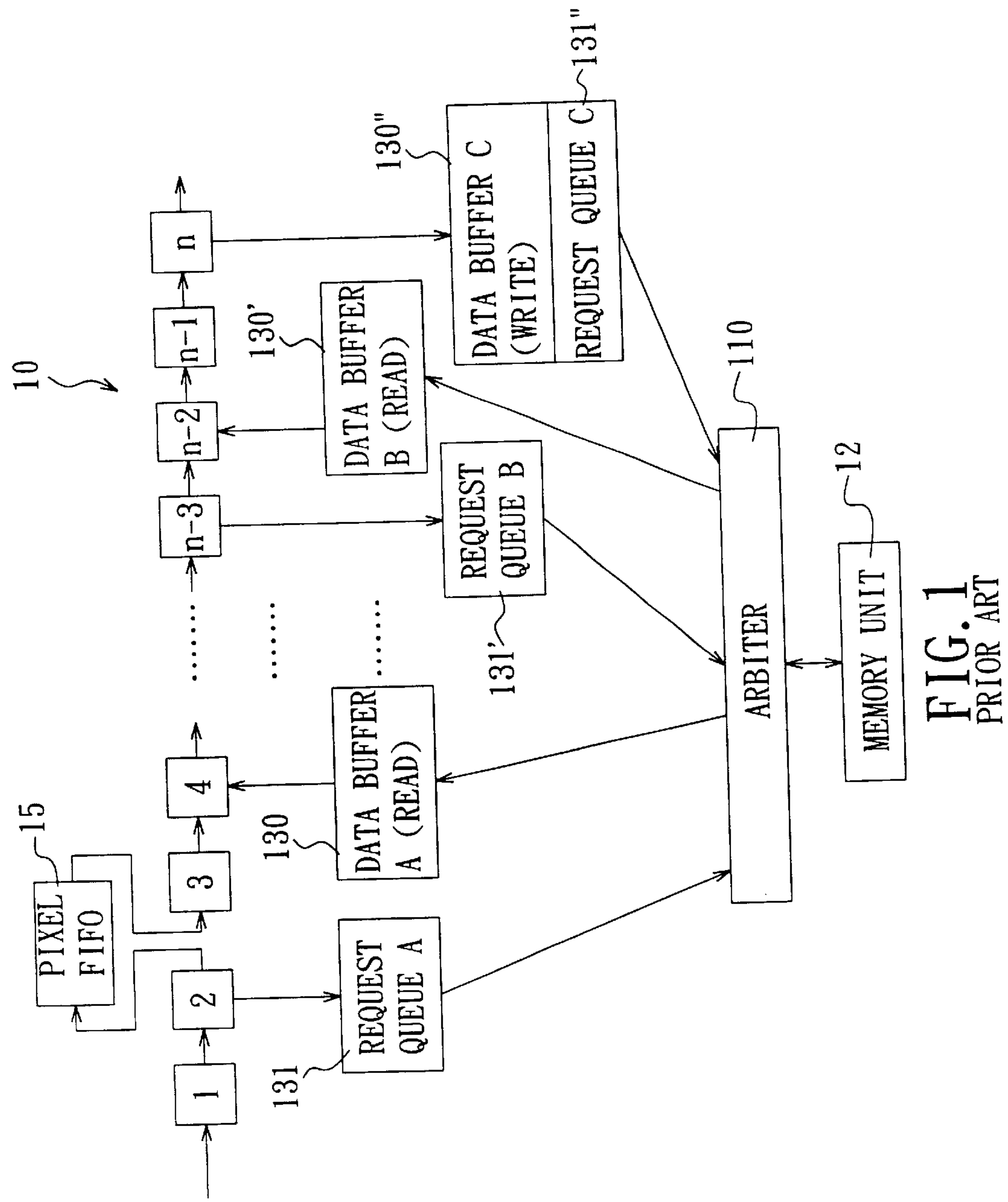
FIG. 1 is a schematic circuit block diagram illustrating a conventional n-stage pipeline engine.
Figure 2:
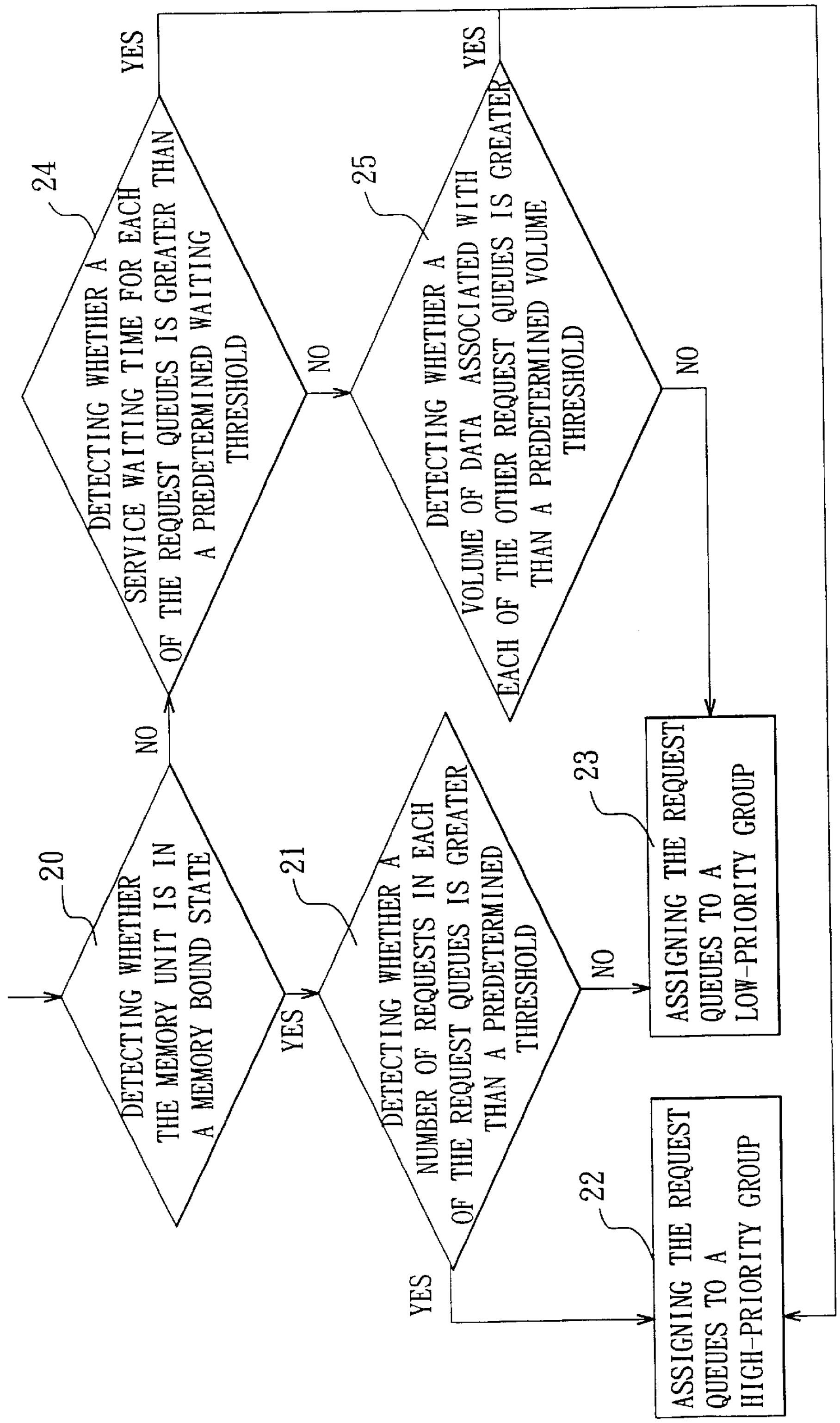
FIG. 2 is a flow chart illustrating how an arbiter of the pipeline engine assigns the request queues into a high-priority group and a low-priority group in the preferred embodiment of a method for adaptive arbitration of requests for memory access according to this invention.
Figure 3:
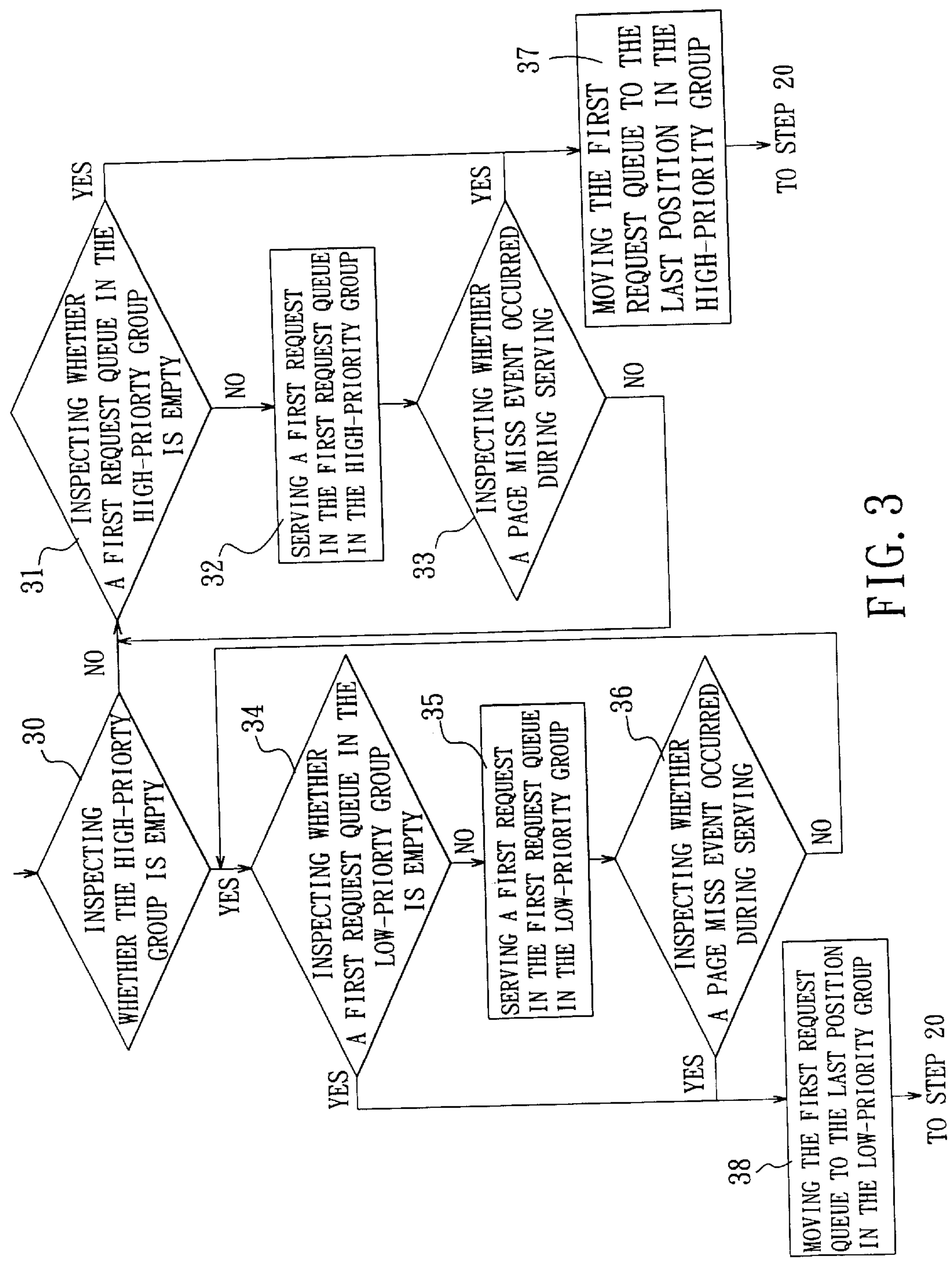
FIG. 3 is a flow chart illustrating how the arbiter processes the request queues when the memory unit is in a memory bound state in accordance with the method of the preferred embodiment.
Figure 4:
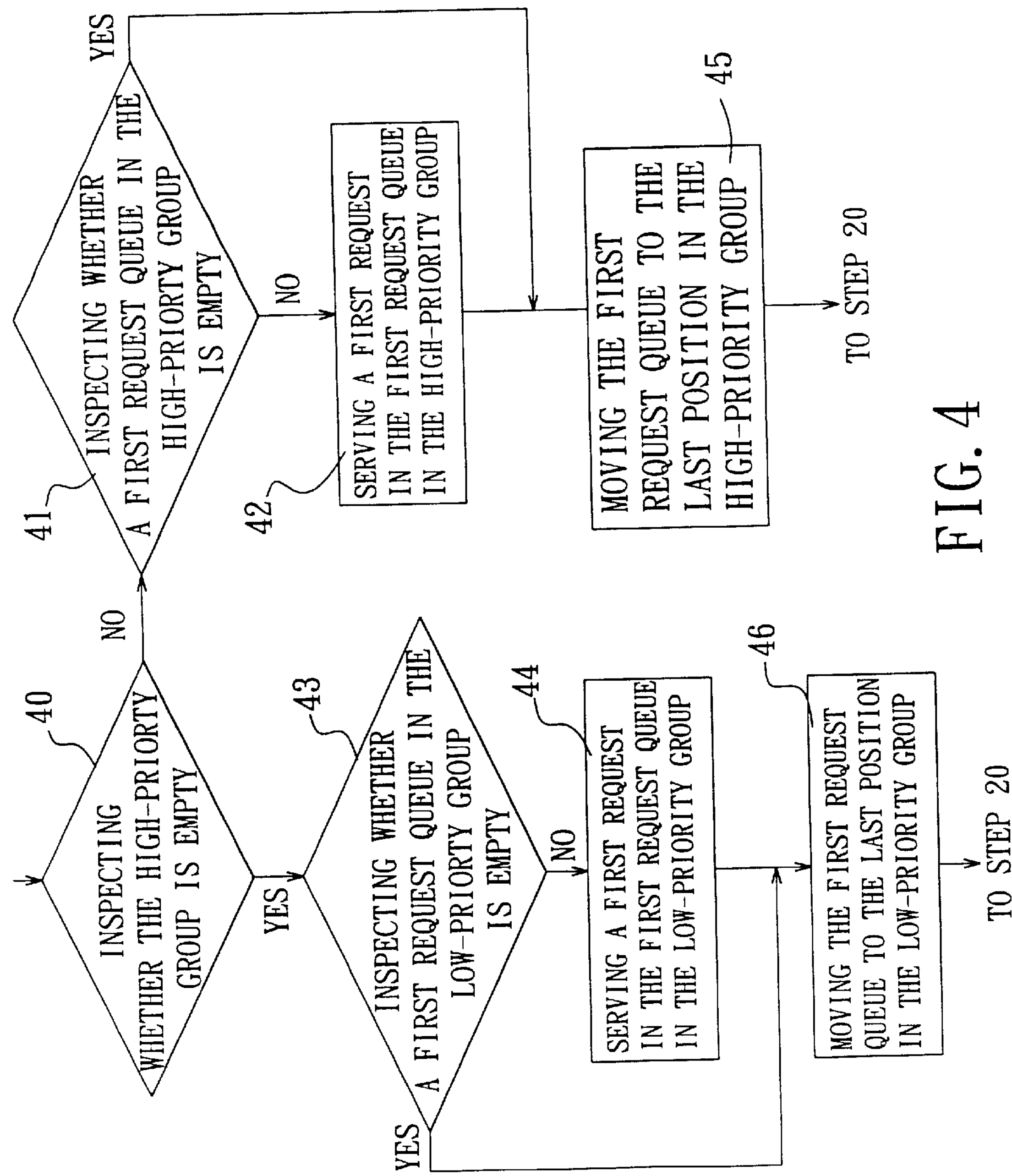
FIG. 4 is a flow chart illustrating how the arbiter processes the request queues when the memory unit is not in the memory bound state in accordance with the method of the preferred embodiment.

The preferred embodiment of a method according to the present invention is shown in FIGS. 2 to 4. The method of the preferred embodiment is to be applied to the conventional n-stage pipeline engine 10 shown in FIG. 1, and is adapted for adaptive arbitration of requests for accessing the memory unit 12 in the conventional n-stage pipeline engine 10.

Referring to FIG. 2, there is shown a flow chart to illustrate how the arbiter 110 assigns the request queues to one of a high-priority group and a low-priority group according to the method of the preferred embodiment. In step 20, the arbiter 110 detects whether the memory unit 12 is in a memory bound state. Then, in step 21, when the memory unit 12 is in the memory bound state, the arbiter 110 detects whether a number of requests in each of the request queues 131 is greater than a predetermined threshold. The detection is conducted from a downstream end of the pipeline engine 10 to an upstream end of the pipeline engine 10. In step 22, for the request queues 131 that have the number of requests therein greater than the predetermined threshold, the arbiter 110 assigns such request queues 131 to the high-priority group. In step 22, for the request queues 131 that have the number of requests therein not greater than the predetermined threshold, the arbiter 110 assigns such request queues 131 to the low-priority group. It is noted that the predetermined threshold can vary for the different request queues in the method of the preferred embodiment. In step 24, when the memory unit 12 is not in the memory bound state, the arbiter 110 detects whether a service waiting time for each of the request queues 131 is greater than a predetermined waiting threshold. The detection is conducted from a downstream end of the pipeline engine 10 to an upstream end of the pipeline engine 10. If yes, the flow proceeds to step 22. In step 25, after step 24, for the other request queues that have the service waiting time thereof not greater than the predetermined waiting threshold, the arbiter 110 detects whether a volume of data associated with each other request queues is greater than a predetermined volume threshold. If yes, the flow goes to step 22. Otherwise, the flow proceeds to step 23. It should be noted that the predetermined waiting and volume thresholds can be designed so as to be different for the different request queues in the method of the preferred embodiment.

If the priority of a queue is changed, the queue is added to the respective priority group behind the last queue in said priority group. Otherwise, the queue maintains its position in the original priority group. Referring to FIG. 3, there is shown a flow chart to illustrate how the arbiter 110 processes the request queues 131 when the memory unit 12 is in the memory bound state according to the method of the preferred embodiment. In step 30, the arbiter 110 initially inspects whether the high-priority group is empty. Then, in step 31, when the high-priority group is not empty, the arbiter 110 inspects whether a first request queue in the high-priority group is empty. If yes, the first request queue is moved to the last position in the high-priority group (step 37), and the flow goes back to step 20. In step 32, when the first request queue in the high-priority group is not empty, the arbiter 110 serves a first request in the first request queue in the high-priority group. In step 33, the arbiter 110 inspects whether a page miss event occurred during serving. If yes, the first request queue is moved to the last position in the high-priority group (step 37), and the flow goes back to step 20. Otherwise, the flow goes back to step 31. In step 34, when the high-priority group is empty, the arbiter 110 inspects whether a first request queue in the low-priority group is empty. If yes, the first request queue is moved to the last position in the low-priority group (step 38), and the flow goes back to step 20. In step 35, when the first request queue in the low-priority group is not empty, the arbiter 110 serves a first request in the first request queue in the low-priority group. In step 36, the arbiter 110 inspects whether a page miss event occurred during serving. If yes, the first request queue is moved to the last position in the low-priority group (step 38), and the flow goes back to step 20. Otherwise, the flow goes back to step 34.

Referring to FIG. 4, there is shown a flow chart to illustrate how the arbiter 110 processes the request queues 131 when the memory unit 12 is not in the memory bound state according to the method of the preferred embodiment. In step 40, the arbiter 110 initially inspects whether the high-priority group is empty. Then, in step 41, when the high-priority group is not empty, the arbiter 110 inspects whether a first request queue in the high-priority group is empty. If yes, the first request queue is moved to the last position in the high-priority group (step 45), and the flow goes back to step 20. In step 42, when the first request queue in the high-priority group is not empty, the arbiter 110 serves a first request in the first request queue in the high-priority group, the first request queue is moved to the last position in the high-priority group (step 45), and the flow goes back to step 20. In step 43, when the high-priority group is empty, the arbiter 110 inspects whether a first request queue in the low-priority group is empty. If yes, the first request queue is moved to the last position in the low-priority group (step 46), and the flow goes back to step 20. In step 44, when the first request queue in the low-priority group is not empty, the arbiter 110 serves a first request in the first request queue in the low-priority group, the first request queue is moved to the last position in the low-priority group (step 46), and the flow goes back to step 20.

Referring to FIG. 1, when the data buffer C 130" is not empty but the service waiting time of the request queue B 131' is greater than the predetermined waiting threshold, the arbiter 110 processes the request queue B 131' prior to the request queue 131" according to the method of this invention. Therefore, the occurrence of stalling as encountered in the prior art can be reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for adaptive arbitration of requests for accessing a memory unit in a multi-stage pipeline engine that includes a plurality of request queues corresponding to the stages of the pipeline engine, comprising the steps of:

(a) assigning each of the request queues to one of a high-priority group and a low-priority group in accordance with an operating state of the memory unit including a-1 detecting whether the memory unit is in a memory bound state; and a-2 when the memory unit is in the memory bound state, detecting a number of requests in each of the request queues, wherein the request queues that have the number of requests therein greater than a predetermined threshold are assigned to the high-priority group, and the request queues that have the number of requests therein not greater than the predetermined threshold are assigned to the low- priority group; and (b) processing the request queues in the high-priority group prior to the request queues in the low-priority group.

2. The method of claim 1, wherein step (b) includes the sub-step of:

(b-1) inspecting whether the high-priority group is empty;

(b-2) upon detection that the high-priority group is not empty, inspecting whether a first request queue in the high-priority group is empty; and (b-3) upon detection that the first request queue in the high-priority group is not empty, serving a first request in the first request queue in the high-priority group.

3. The method of claim 2, wherein step (b) further includes the sub-steps of:

(b-4) inspecting whether a page miss event occurred during serving;

(b-5) when no page miss event occurred during serving, proceeding back to sub-step (b-3) to continue serving of other requests in the first request queue in the high-priority group; and (b-6) repeating step (a) when serving of the first request queue in the high-priority group is completed, or when the page miss event occurred during serving.

4. The method of claim 2, wherein step (b) further includes the step of:

(b-4) repeating step (a) after serving the first request in the first request queue in the high-priority group.

5. The method of claim 1, wherein step (b) includes the sub-step of:

(b-1) inspecting whether the high-priority group is empty;

(b-2) upon detection that the high-priority queue group is empty, inspecting whether a first request queue in the low-priority group is empty; and (b-3) upon detection that the first request queue in the low-priority group is not empty, serving a first request in the first request queue in the low-priority group.

6. The method of claim 5, wherein step (b) further includes the sub-steps of:

(b-4) inspecting whether a page miss event occurred during serving;

(b-5) when no page miss event occurred during serving, proceeding back to sub-step (b-3) to continue serving of other requests in the first request queue in the low-priority group; and (b-6) repeating step (a) when serving of the first request queue in the low-priority group is completed, or when the page miss event occurred during serving.

7. The method of claim 5, wherein step (b) further includes the step of:

(b-4) repeating step (a) after serving the first request in the first request queue in the low-priority group.

8. A method for adaptive arbitration of requests for accessing a memory unit in a multi-stage pipeline engine that includes a plurality of request queues corresponding to the stages of the pipeline engine, comprising the steps of:

(a) assigning each of the request queues to one of a high-priority group and a low-priority group in accordance with an operating state of the memory unit including (a-1) detecting whether the memory unit is in a memory bound state; and (a-2) when the memory unit is not in the memory bound state, detecting a service waiting time for each of the request queues, wherein the request queues that have the service waiting time thereof greater than a predetermined waiting threshold are assigned to the high-priority group; and (b) processing the request queues in the high-priority group prior to the request queues in the low-priority group.

9. The method of claim 8, wherein step (a) further includes the sub-step of:

(a-3) after step (a-2), for the other request queues that have the service waiting time thereof not greater than the predetermined waiting threshold, detecting a volume of data associated with each of the other request queues, wherein the request queues that have the associated volume of data thereof greater than a predetermined volume threshold are assigned to the high-priority group, and the request queues that have the associated volume of data thereof not greater than the predetermined volume threshold are assigned to the low-priority group.

10. A method for adaptive arbitration of requests for accessing a memory unit in a multi-stage pipeline engine that includes a plurality of request queues corresponding to the stages of the pipeline engine, comprising the steps of:

(a) assigning each of the request queues to one of a high-priority group and a low-priority group in accordance with an operating state of the memory unit; and (b) processing the request queues in the high-priority group prior to the request queues in the low-priority group including (b-1) inspecting whether the high-priority group is empty;

(b-2) upon detection that the high-priority queue group is empty, inspecting whether a first request queue in the low-priority group is empty;

(b-3) upon detection that the first request queue in the low-priority group is not empty, serving a first request in the first request queue in the low-priority group;

(b-4) inspecting whether a page miss event occurred during serving;

(b-5) when no page miss event occurred during serving, proceeding back to sub-step (b-3) to continue serving of other requests in the first request queue in the low-priority group; and (b-6) repeating step (a) when serving of the first request queue in the low-priority group is completed, or when the page miss event occurred during serving.

11. The method of claim 10, wherein step (a) includes the sub-steps of:

(a-1) detecting whether the memory unit is in a memory bound state; and (a-2) when the memory unit is in the memory bound state, detecting a number of requests in each of the request queues, wherein the request queues that have the number of requests therein greater than a predetermined threshold are assigned to the high-priority group, and the request queues that have the number of requests therein not greater than the predetermined threshold are assigned the low-priority group.

* * * * *